Figure 16:
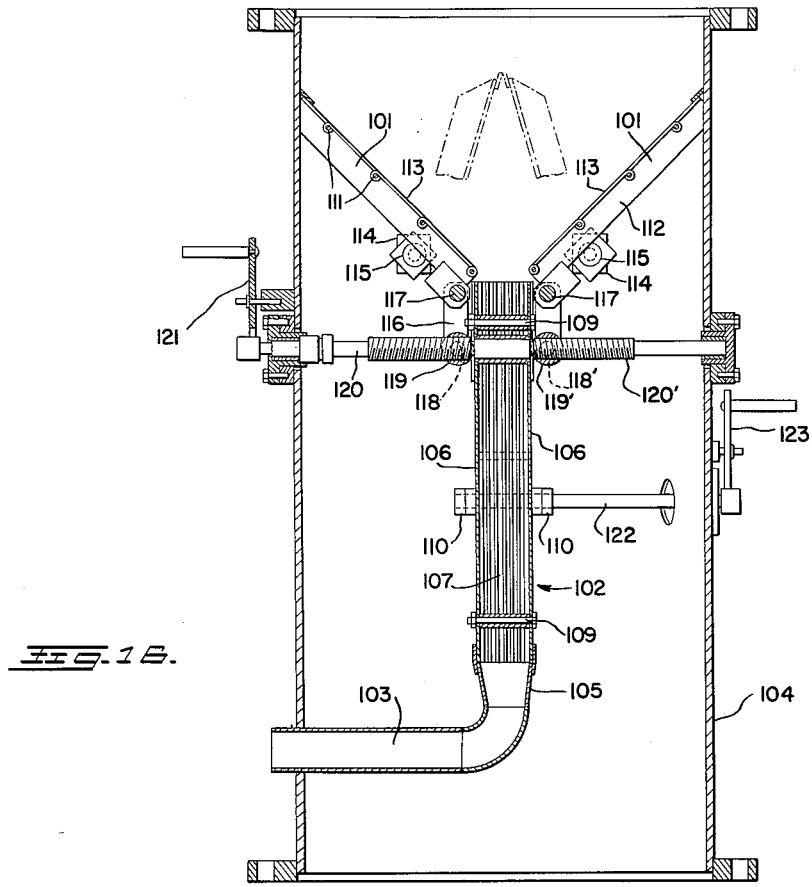

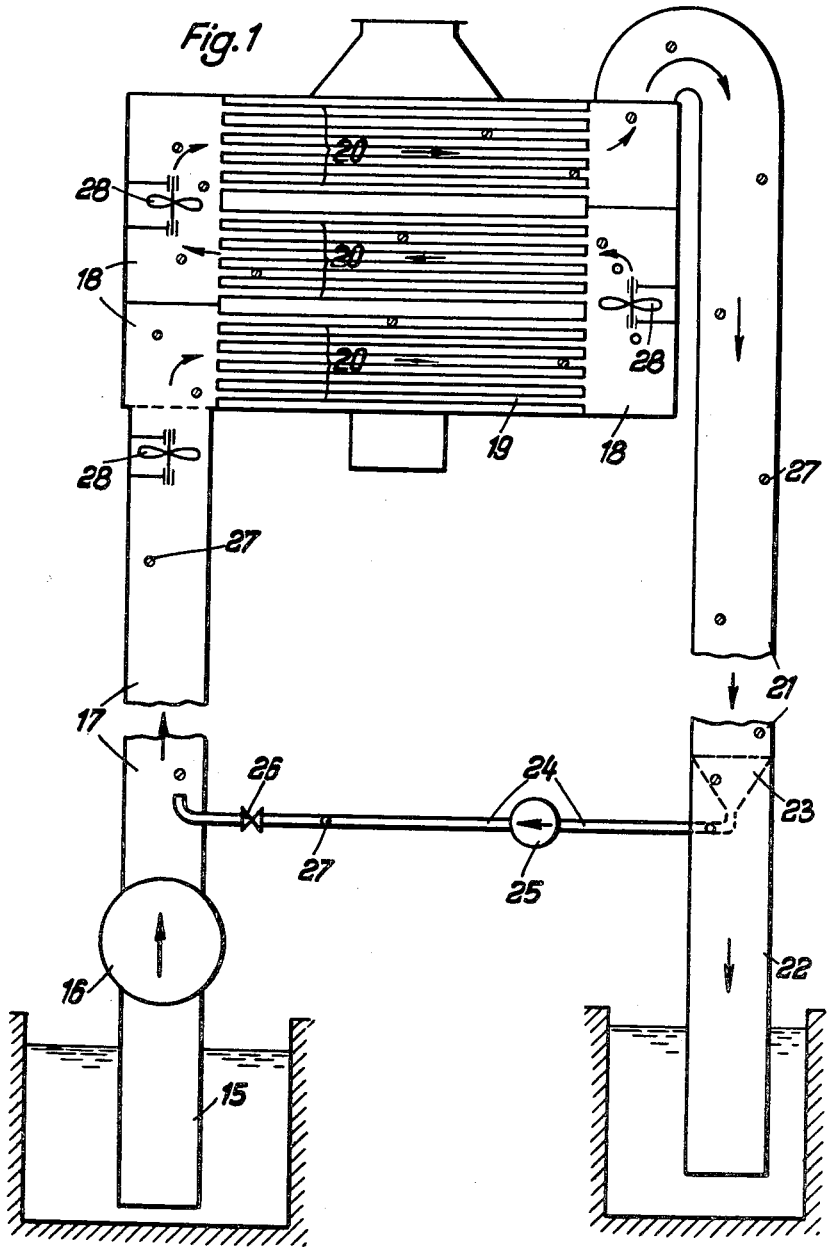

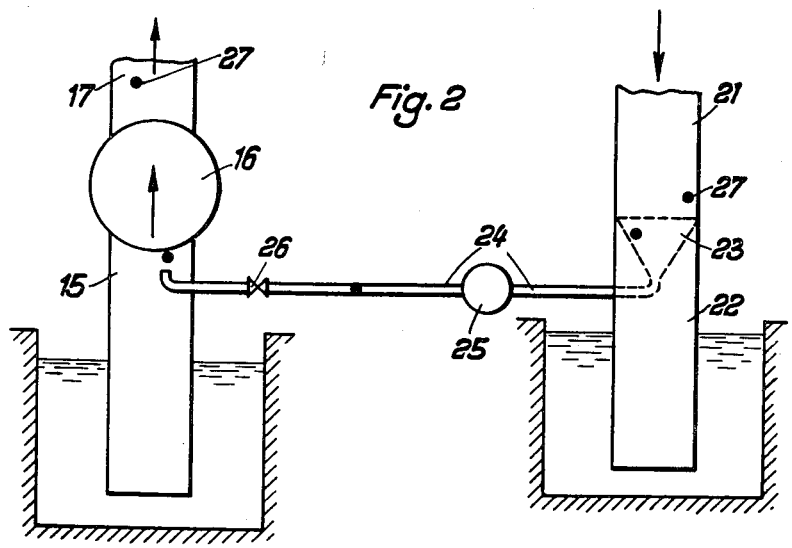
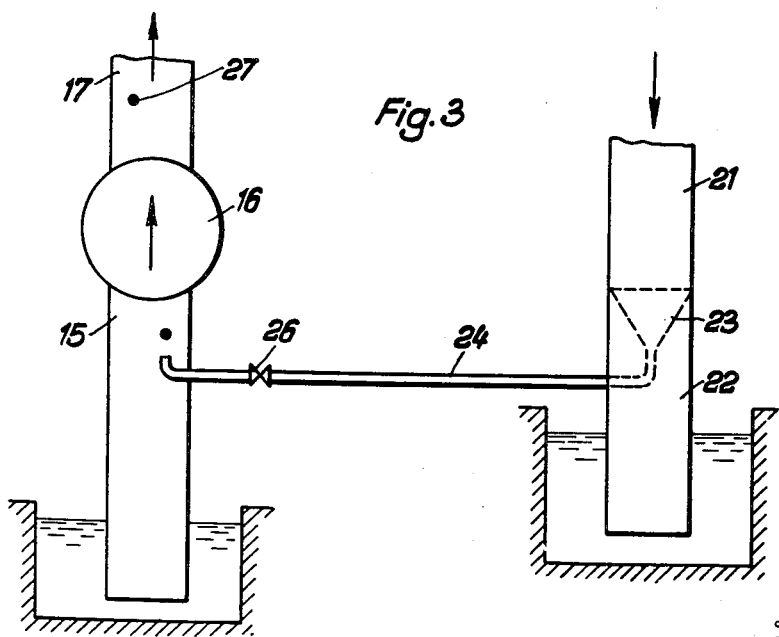

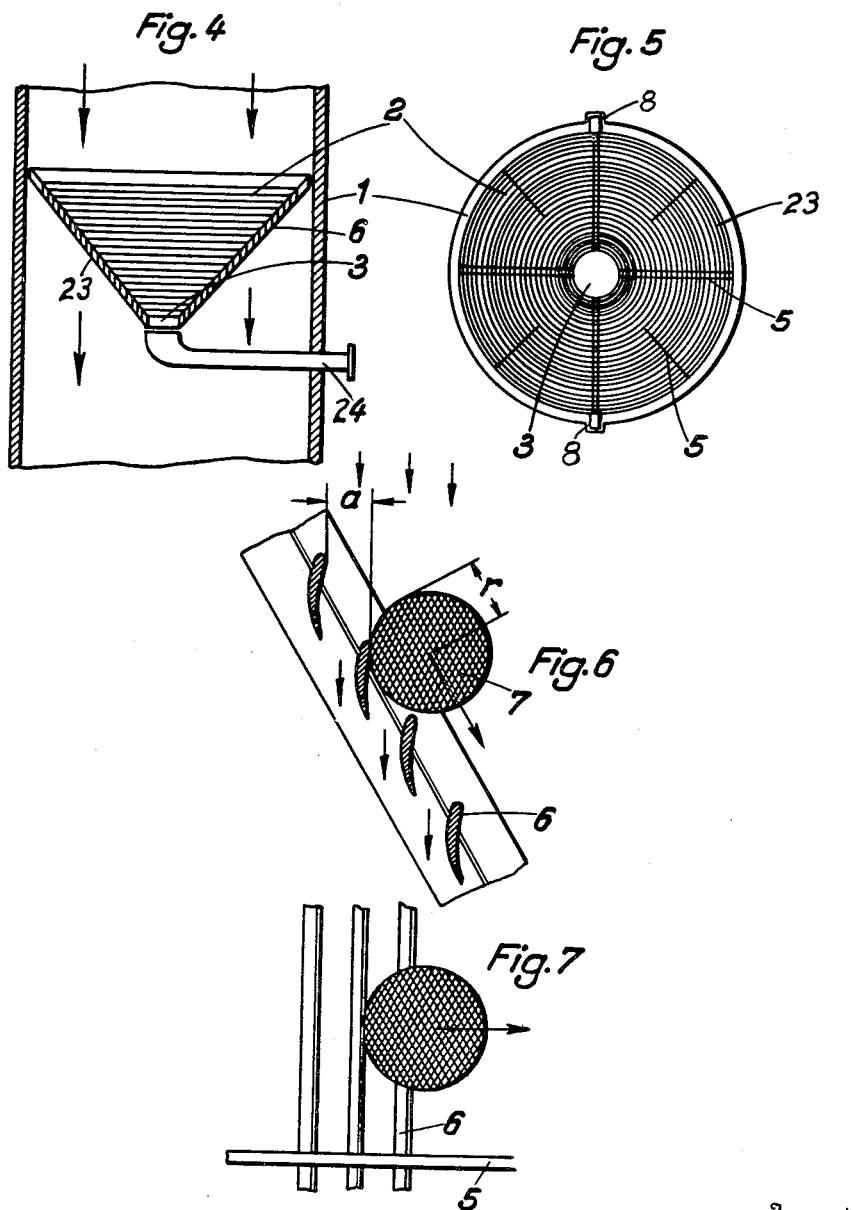

Feb. 13, 1962     J. TAPROGGE     3,021,117
SELF-CLEANING HEAT-EXCHANGER
Filed July 23, 1957     7 Sheets-Sheet 4
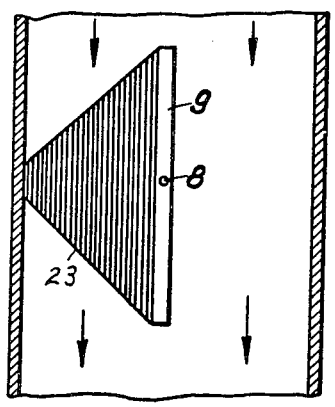
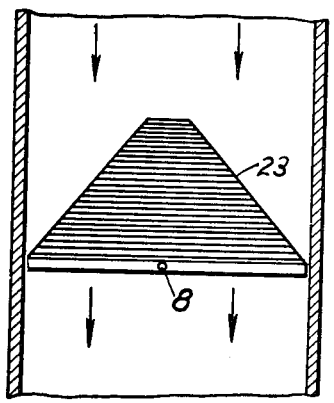
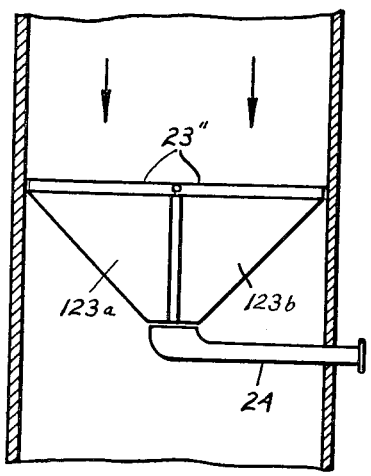
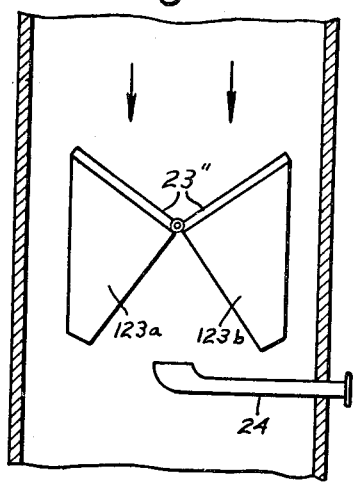
Inventor
JOSEF TAPROGGE
By Dick and Craig
Attorneys Feb. 13, 1962 J. TAPROGGE 3,021,117
SELF-CLEANING HEAT-EXCHANGER
Filed July 23, 1957 7 Sheets-Sheet 5
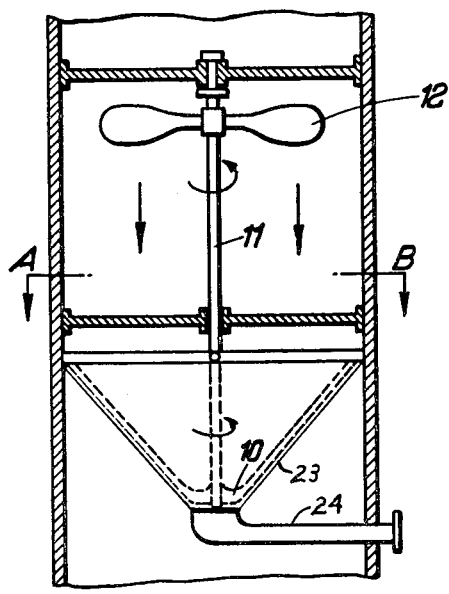
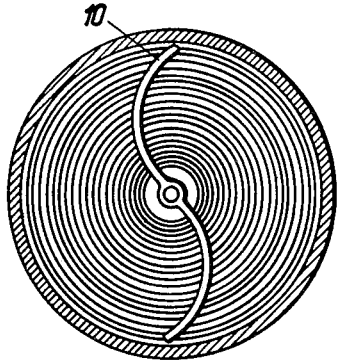
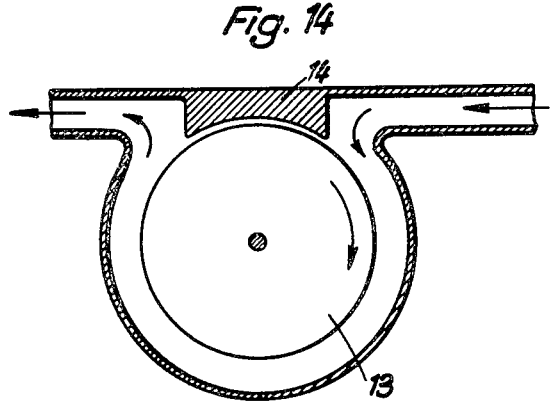
Inventor
JOSEF TAPROGGE
By Dicke and Craig
Attorneys Feb. 13, 1962   J. TAPROGGE   3,021,117
SELF-CLEANING HEAT-EXCHANGER
Filed July 23, 1957   7 Sheets-Sheet 6

INVENTOR
JOSEF TAPROGGE
BY Dicke and Craig
ATTORNEYS

Feb. 13, 1962   J. TAPROGGE   3,021,117
SELF-CLEANING HEAT-EXCHANGER
Filed July 23, 1957   7 Sheets-Sheet 7
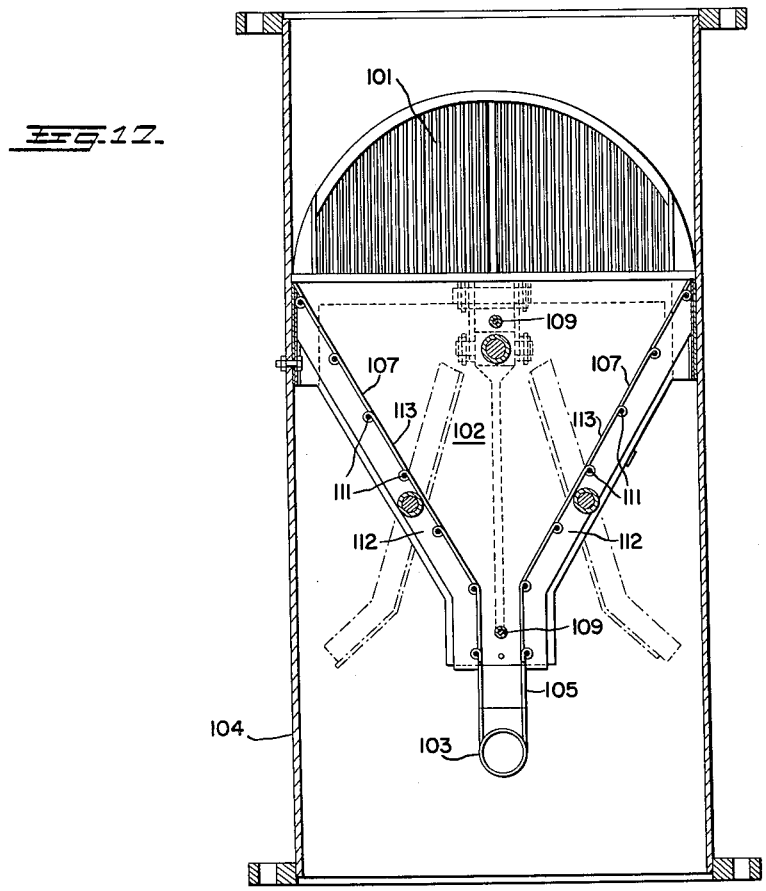
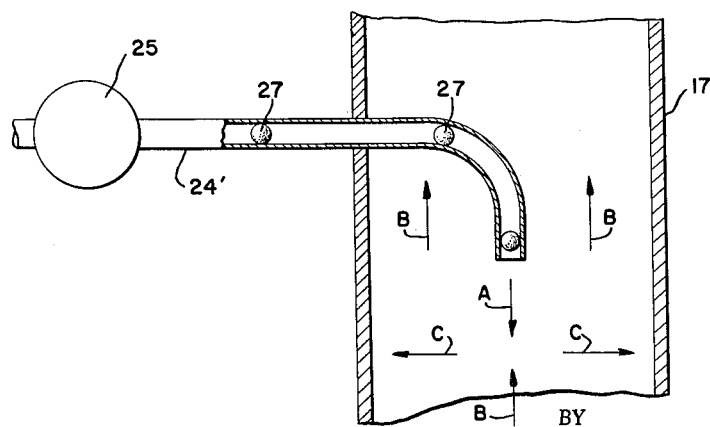
INVENTOR
JOSEF TAPROGGE
Dicke and Hay
ATTORNEYS

| United States Patent Office | 3,021,117 |
|---|---|
| | Patented Feb. 13, 1962 |

3,021,117
SELF-CLEANING HEAT-EXCHANGER
Josef Taprogge, Manteuffelstrasse 19,
Duisburg, Germany
Filed July 23, 1957, Ser. No. 673,634
14 Claims. (Cl. 257—1)

The present application is a continuation-in-part application of my copending application Serial No. 334,687, filed on February 2, 1953, now Patent 2,801,824 and entitled "Self-Cleaning Heat-Exchanger."

This invention relates to an apparatus for self-cleaning heat exchangers of the pipe or tube-type, i.e., in which transfer of heat is effected between two media, one of these media being conveyed through sets of pipes or tubes connected in parallel and the other medium passing through the space between these tubes.

Since the present invention affords great advantages especially in the use of vacuum condensers, mainly this type of heat exchanger is in the following referred to. It is, however, understood that the present invention is not restricted to this kind of heat exchanger but may be used advantageously with all other kinds of heat exchangers of the pipe or tube-type.

As is known to all persons skilled in the art, the efficiency of a heat exchanger of the pipe or tube-type is unavoidably lessened after some time of operating the exchanger. This is due to deposits along the tube walls, especially to deposits at the inner tube walls. Such deposits are caused by mechanical impurities carried with the medium, such as cooling water passing through the pipes or tubes and/or by substances contained in this medium in a state of solution but precipitated therefrom by thermal and/or chemical influences. These deposits impede the heat transition or transfer through the pipe or tube walls and thereby deteriorate the efficiency of the heat exchanger. When this efficiency is lowered to a certain fraction of the original efficiency thereof, the tubes or pipes thereof have to be cleaned mechanically and/or chemically to restore the original efficiency.

Many methods and apparatus are in use for removing impurities and other noxious substances from the medium passing through the pipes or tubes and for periodically cleaning these tubes. For instance, chlorine is added to the fresh cooling water for precipitating the above-named organic substances entering into the tubes. Or, in the alternative, mechanical impurities are removed by filtering the fresh water. Furthermore, in circulatory cooling systems the increased hardness of the circulating cooling water due to evaporation is counteracted by chemically softening the water. All these methods are rather expensive and are, therefore, not in common use. As a rule, the pipes or tubes of the tube-type heat exchangers are only periodically cleaned by mechanically and/or chemically removing the above-named deposits from the tube walls.

Loose sludge may be removed by increasing the velocity of the cooling water, by condenser rinsers and the like, solid sludge is removed by ordinary wire brushes, while very hard sludge deposits are drilled out, and solid stone, such as lime, deposits are dissolved chemically. In all the possibilities referred to hereinabove, it is not always easy to remove the deposits entirely without damaging the tubes. Furthermore, the cleaning of the tubes can only be effected when the condenser is wholly or partly out of operation or while working at a reduced load and with a correspondingly impaired vacuum.

Due to the fact that each subsequent cleaning of the condenser can only be effected after a certain finite period of time, the level of average heat transfer of the cooling tubes, or of the condenser efficiency is, in many cases considerably, lower than the maximum values obtained immediately after the cleaning. For reasons connected with the particular operation of the plant the operating period of the condenser ascertained as being economical sometimes has to be exceeded, the average vacuum of the condenser being further impaired as a necessary consequence thereof. With the methods of cleaning hitherto customary, the average vacuum of a condenser cannot be further appreciably improved by reason of the high costs of a preliminary treatment or conditioning of the cooling water.

The present invention has for its main object to provide an installation which, due to its character and the simplicity of means used thereon, not only involves only low initial costs as well as low subsequent operating costs but also enables a continuous automatic or self-cleaning operation of the pipes or tubes whereby the average condenser vacuum is considerably increased thereby.

Accordingly, it is an object of the present invention to provide a self-cleaning system for heat exchangers which is simple in construction, highly effective in operation and inexpensive in manufacture and installation.

It is another object of the present invention to provide a self-cleaning installation for heat exchangers of the pipe-type which automatically cleans the pipes thereof at all times to maintain the cooling surfaces thereof as clean as possible and therewith to assure continuous maximum heat transfer efficiency.

It is still another object of the present invention to provide a self-cleaning installation for heat exchangers which use rubbing balls made of elastic material, and more particularly to provide an intercepting device for these rubbing bodies to separate the same out of the cooling medium main discharge conduit in an appropriate manner and return the same to the main supply conduit.

Still a further object of the present invention resides in the provision of an intercepting device for intercepting the rubbing bodies which assures minimum flow resistance to the cooling medium, which may be adjusted into a position so as to be automatically cleaned by the discharge flow of the cooling medium and which is furthermore adapted to be placed into a position in which minimum flow resistance is offered thereby to the flow of the cooling medium when the self-cleaning installation is not in use.

Still a further object of the present invention resides in a particularly appropriate arrangement for the introduction of the rubbing bodies into the supply conduit of the heat exchanger to assure random distribution thereof into all the cooling pipes or tubes.

Still another object of the present invention resides in the provision of means for operating the self-cleaning installation as economically as possible, particularly as regards the use of rubbing bodies thereof.

These and further objects, features and advantages of the present invention will become more obvious from the following description when taken in connection with the accompanying drawing which shows for purposes of illustration only, several embodiments in accordance with the present invention and wherein:

FIGURE 1 is a diagram showing a self-cleaning installation in accordance with the present invention for a condenser plant incorporating one embodiment of the present invention, FIGURES 2 and 3 show modifications in accordance with the present invention of the self-cleaning installation illustrated in FIGURE 1, FIGURES 4 and 5 are an axial section and plan view respectively of one form of an intercepting and cleaning device for the rubbing bodies, FIGURES 6 and 7 are details thereof shown at an enlarged scale.

Figure 17:
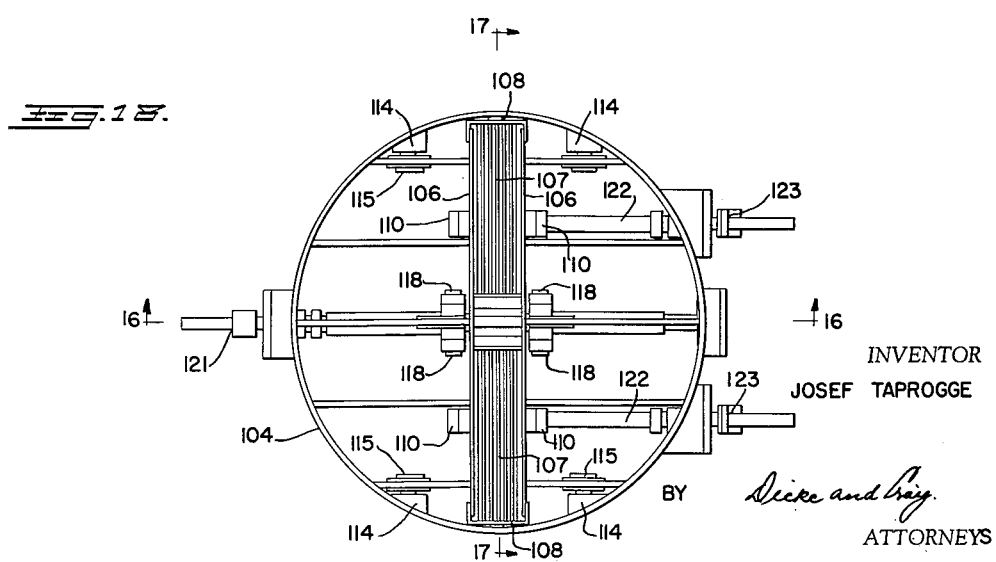

FIGURES 8 and 9 illustrate the manner in which the device may be cleaned,

FIGURES 10 and 11 are sectional views illustrating a modification in accordance with the present invention, FIGURE 12 is an axial section of another modification, FIGURE 13 is a cross-section on line A—B of FIGURE 12, FIGURE 14 is a diagrammatic view showing an axial acceleration pump for use in conjunction with the method of the present invention, FIGURE 15 is a diagrammatic view showing a particularly favorable arrangement in accordance with the present invention for introducing the rubbing bodies into the main supply conduit of the heat exchanger, FIGURE 16 is a cross-sectional view taken along line 16—16 of FIGURE 18 of an intercepting device in accordance with the present invention, FIGURE 17 is a cross-sectional view taken along line 17—17 of FIGURE 18 of the intercepting device illustrated in FIGURE 16, and FIGURE 18 is a top plan view of the intercepting device illustrated in FIGURES 16 and 17.

According to the present invention, the heat exchanging elements, such as cooling pipes or tubes, are automatically cleaned in turn at short intervals by rubbing bodies during the operation of the heat exchanger, such as a vacuum condenser, these rubbing bodies being carried along the tube walls by the liquid cooling medium, such as cooling water, on its way through the condenser, whereby the cooling water, on its way through the condenser, simultaneously serves as liquid carrier and, within the cooling tubes, as pressure medium for the rubbing bodies. Advantageously, the rubbing bodies are moved through the heat exchanger in continuous circulation, are intercepted at the outlet of the spent liquid medium by a suitable intercepting device, and are thereupon returned again into the fresh liquid medium supplied to the heat exchanger. The spent cooling water, i.e., the cooling water heated in the heat exchanger and leaving the condenser may be conducted through a device, to be described more fully hereinafter, which permits the water to flow on unimpededly into the outlet or discharge conduit, while the rubbing bodies are intercepted and may be conducted, in a branch stream of the heated cooling water, into a return conduit through which, for example, by means of a pump, such as a return pump, they are re-introduced into the fresh cooling water flowing into the condenser through the supply conduit thereof thereby once more commencing their circulation.

The present invention also provides apparatus for cleaning and reconditioning the rubbing bodies after use. According to this feature of the present invention, the rubbing bodies, after leaving the cooling tubes of the condenser or the like, are conducted in continual succession over a cataract or intercepting device which permits the flow of water to pass therethrough substantially without hindrance but which, like a sieve, holds back the rubbing bodies, subjecting the same to repeated dropping impacts producing elastic deformation, whereby the bodies get rid of retained foreign particles and are thereby regenerated.

According to a modification of this apparatus, a portion of the rubbing bodies leaving the cataract or intercepting device may be withdrawn, preferably by means of a suitable lock or removal device, from the shunt circuit and then reintroduced after thorough regeneration or replaced by other bodies. The method may be further modified by providing the rubbing bodies with a coating of abrasive material.

Referring now to the drawing wherein like reference numerals are used throughout the various views to designate like parts, and more particularly to FIGURES 1 to 3, the condenser elements illustrated therein, such as cooling pipes or tubes 19, are arranged to be cleaned in turn at short intervals during the operation of the condenser by rubbing bodies 27, the condenser liquid, such as cooling water, serving on its way through condenser for carrying the rubbing bodies along and also acting, within the cooling tubes 19, as propagating pressure medium for the bodies 27. During cleaning operation of the condenser tubes 19, the rubbing bodies 27 move in continuous circulation in that they are conveyed through the condenser by the cooling water therefor, are intercepted at the condenser outlet conduit or pipe 21 by a suitable intercepting device 23, and are returned again into the stream of cooling water supplied to the condenser from a cooling water pump 16 through supply or inlet conduit 17. The heated cooling water leaving the condenser passes through the intercepting device 23, the latter permitting the cooling water to flow on essentially unimpededly from condenser outlet conduit 21 into a discharge pipe or conduit 22, while causing the rubbing bodies 27 to be intercepted and conducted in a branch stream of the heated cooling water into a return or shunt conduit 24 through which they are re-introduced (FIGURES 1 and 2) by means of an auxiliary pump 25 into the fresh cooling water flowing into the condenser through inlet conduit 17 at the condenser inlet side, thus once more commencing their circulation.

The intercepting and conducting device for the rubbing bodies may consist of a funnel-shaped strainer 23 or of a screen or grating arranged within the condenser outlet pipe 21 or within the discharge conduit 22 and connected to a return device for the rubbing bodies 27. This return device may comprise a return pipe 24 equipped with a return pump 25, which may be constructed as a centrifugal pump, water injector pump, or the like.

It is generally possible to convey the rubbing bodies without damage through the condenser cooling water pump 16. In this case (FIGURES 2 and 3), the return conduit 24 for the rubbing bodies 27 may open into the suction pipe 15 of the condenser cooling water pump 16. Since, on the other hand, in most practical cases, a substantial pressure difference exists between the condenser outlet or discharge conduit 22 and the suction pipe 15 of the cooling water pump 16, a separate return pump for re-circulating the rubbing bodies 27 is unnecessary in that case. Such an arrangement offers a particularly advantageous and simple form of apparatus for carrying out the method in accordance with the present invention, since in addition to the particular rubbing bodies 27 only the intercepting and conducting device 23 in the condenser outlet conduit 21 or discharge conduit 22 and the return conduit 24 to the suction pipe 15 of the condenser cooling water pump 16 are necessary for completing the installation.

The rubbing bodies 27 impinging upon the intercepting device 23 provided in the condenser discharge pipes 22 are cleaned thereat by the heated cooling water passing therethrough and are thereupon returned into circulation in a regenerated, i.e., clean condition.

The elasticity and size of the rubbing bodies 27 is so chosen that as great as possible a rubbing surface can be formed in the cooling tube. This is obtained by giving to the rubbing bodies 27 a free diameter which is at least as great as the internal diameter of the tubes through which the rubbing bodies 27 move, although in practice it is preferable to use a greater diameter. The rubbing bodies are subjected in the cooling tubes to a maximum drive corresponding to the pressure drop which in operation of the condenser develops between the inlet and outlet ends of the cooling tubes 19 or of the water passages 20 in the condenser. This pressure drop corresponds mainly to the flow resistance of the cooling water while normally passing through the cooling tubes 19. In order to avoid the risk that any of the tubes may become blocked, this pressure drop or head must be so great as to enable the cooling water to convey, if necessary, a plurality of rubbing bodies 27 simultaneously through a cooling tube. This safety factor must also be taken into consideration in choosing the elasticity and size of the rubbing bodies 27. If the contamination of the cooling water is low, it is not generally necessary to choose the cross-section of the rubbing bodies much greater than that of the cooling pipes 19, the irregular movement of the rubbing bodies 27 in the cooling tubes being sufficient for effecting the cleaning if the rubbing bodies are at least as large in diameter as the free inside diameter of the pipes or tubes 19.

As material for the rubbing bodies, sponge rubber is particularly suitable. The cleaning effect of this porous substance is so great that the deposits, which in view of the frequent cleaning of each individual tube are only minute, are entirely removed during each cleaning operation. While the rubbing bodies are forced through the cooling tubes by the cooling water, the water also conveys the deposits and other impurities detached from the walls of the tube in front of the rubbing bodies, thereby preventing the rubbing bodies from becoming excessively soiled.

With regard to the shape of the rubbing bodies, a spherical shape is normally particularly advantageous for circular pipes or tubes, whereby the rubbing bodies are made of elastic material, such as sponge rubber, throughout the entire spherical volume thereof. The fact that the rubbing surface of a sphere is great in relation to its volume permits long use of the bodies. Furthermore, the resistance of a spherical body is approximately equal in all positions, which is of particular importance at the entry of the rubbing bodies into a cooling tube. Moreover, the interception and return of spherical rubbing bodies after passage through the condenser is relatively easy owing to the rolling movement of the bodies.

While the apparatus described hereinabove generally refers to the cleaning of cooling pipes of heat exchangers having circularly shaped internal cross sections, in practice other pipe or tube cross sections may be used as, for example, cooling pipes of elliptic cross sections may also be found in certain installations. Rubbing bodies made of elastic rubbing material throughout are the less suitable the more the cross sectional radii of the cooling pipes are different from one another. Full spherically shaped rubbing bodies, i.e., rubbing bodies made throughout of rubbing material, maintain, if they are compressed between two surfaces, essentially their circular cross section. With an elliptic cross section of the cooling pipe or tube, a full spherically-shaped elastic rubbing body with a diameter which is larger than the minor axis and smaller than the major axis of the elliptical cross section of the cooling pipe would not completely fill the pipe cross section since the rubbing body would enlarge only an insignificant amount by the compressing action over its free diameter in the uncompressed condition thereof. As a result thereof, the pipe surface on the inside thereof is not touched on all sides thereof by the rubbing body and, therefore, cannot be completely cleaned, aside from the fact that by reason of the flow of the cooling medium, which bypasses the rubbing bodies at the places where the rubbing bodies do not touch the inside walls of the pipes, it may happen that essentially no pressure difference is present across the rubbing bodies which normally would force the same through the cooling pipe.

Rubbing bodies which are larger than or equal to the major axis or largest cross sectional diameter of the cooling pipe, in contrast thereto, ordinarily would have to be formed so elastically and of such soft material that they would lack the necessary cleaning intensity in the pipe corners having the smaller radii of curvature.

This problem is solved in accordance with the present invention in that with non-circular cooling pipes, in contrast to the aforementioned full spherically shaped rubbing bodies, hollow spherically shaped elastic rubbing bodies are used which, upon compressing in one direction, may readily become enlarged in the other direction and thereby are capable with cooling pipes of non-circular, for example, elliptical cross section to fill out completely the elliptical cross sections thereof. The rubbing bodies are thereby so selected that the circumference thereof is either preferably greater or at least no less than the circumference of the cooling pipe cross section.

Since the specific weight of the rubbing bodies 27 are chosen equal or almost equal to that of water, they float in the cooling water. This floating action of the rubbing bodies as well as the stirring of the bodies by the pump 16 or also possibly by a special stirring apparatus 28 in the supply conduit or pipe 17 and in the water chambers 18 of the condenser ensures a uniform distribution of the rubbing bodies 27 through all the cooling tubes 19 and therewith a uniform and satisfactory cleaning of all cooling tubes over a given period of time.

As already mentioned hereinabove, an even distribution of the rubbing bodies over all cooling pipes of the heat exchanger is achieved primarily in that the rubbing bodies 27 have essentially the same specific weight as the cooling medium, and in that, by reason of the particular size of the rubbing bodies and the resulting friction within the cooling pipes, successive rubbing bodies are directed always into free or empty cooling pipes which offer a larger flow velocity of the cooling medium than those cooling pipes through which a rubbing body is presently being conveyed.

While FIGURE 1 shows the use of special agitating or stirring devices 28, which increase the cost of the equipment, a particularly simple, inexpensive and highly effective arrangement for the introduction of the rubbing bodies 27 into the supply conduit 17 is illustrated in FIGURE 15, which arrangement may be readily used with any installation in accordance with the present invention.

Thus FIGURE 15 illustrates an arrangement for the introduction of the rubbing bodies which further enhances the even random distribution of the rubbing bodies 27 and thereby further assures equal distribution of the number of rubbing bodies in all the pipes over a predetermined period of time, and essentially consists of the arbitrary random distribution thereof over the entire pipe cross section of the cooling medium supply conduit 17 leading to the pipes 19 of the heat exchanger. If an arbitrary, random distribution in the supply line 17 leading to the pipes 19 of the heat exchanger is once obtained then by reason of the specific weight of the individual rubbing bodies 27 which is matched to that of the cooling medium the rubbing bodies 27 remain thus distributed in their respective cooling medium stream along their way to the individual cooling pipes 19. For purposes of achieving this effect the rubbing bodies 27 are introduced into the cooling medium supply conduit 17 of the pipe heat exchanger according to the counterflow principle as illustrated in FIGURE 15. The two streams of flows impinging upon each other thereby produce, by reason of the deflection in the flow thereof, whirls or eddies accompanied by radial flow in the cooling medium supply conduit 17 and therewith a random distribution of the rubbing bodies 27 over the entire pipe cross section analogous to the case of the use of a deflection plate.

This is illustrated in FIGURE 15 of the drawing in which reference numeral 17 indicates the supply line for the cooling medium of a heat exchanger provided with cooling pipes (not shown). A supply line 24' coming from the pressure side of the auxiliary return pump 25 is located essentially centrally within the fluid medium supply line 17. The rubbing bodies 27 are discharged from the supply line 24' in the direction of the arrow A. The flow of the cooling medium is in the direction of the arrow B. If the flow of cooling medium is, for example 10,000 c.f.m. in the supply line 17, whereas the flow in the line 24', for example, is 20 c.f.m., then the impact of he two flows produces a radial flow C which distributes he rubbing bodies 27 at random evenly over the entire cross section of the supply line 17 and thereby assures equal distribution of the rubbing bodies through all the cooling pipes of the heat exchangers.

In each case, with a suitable number of the rubbing bodies 27 kept in circulation, a perfect cleaning of all cooling tubes 19 is effected. The impurities are removed from the cooling tubes 19 in the shortest possible time depending on the number of the rubbing bodies 27, without the danger that any soiling of the cooling device of any practical significance may first take place. By choosing the number of rubbing bodies 27 in accordance with the cooling water qualities and the cooling surface of the condenser, and by the possibility of using at the same time rubbing bodies, for instance, having different friction qualities, the maximum possible heat transfer condition may be maintained in the cooling tubes 19.

In the self-cleaning method according to the present invention, the cooling water capacity of the condenser is almost not influenced by the presence of the rubbing bodies. The fact that a small amount of heated cooling water flowing through return conduit 24 or 24′ re-enters with the returned rubbing bodies into the fresh cooling water flowing through supply conduit 17 likewise has little practical effect upon the vacuum obtained in the condenser, particularly in view of the gain which is permanently secured by the relatively clean condenser cooling surface of the cooling pipes 19.

The intercepting device 23 for cleaning the used rubbing bodies 27 may, with advantage, be constructed as a funnel-shaped cataract, one suitable embodiment of such a device 23 being now described hereinafter with reference to FIGURES 4 to 9.

A funnel-shaped cataract or intercepting device generally designated by reference numeral 23 in FIGURES 4 and 5 is mounted in the cooling water outlet pipe designated again by reference numeral 17 whereby the rubbing bodies 27 are intercepted at the lowest point 3 of the funnel-shaped cataract and thereupon are returned to the shunt or return conduit 24 of the water circulation circuit. The cataract 23 is formed of individual rings 6 disposed coaxially in a step-like manner and held together by supporting bars 5. As will be seen more clearly in FIGURES 6 and 7, the rings 6 are streamlined in cross section, that is to say, their cross-section may be drop-shaped or shaped similarly to steam-turbine blades. The spacing $a$ of the rings 6 generally has to be smaller than the diameter of the rubbing bodies 27. It is, however, advisable to reduce this spacing further to a value smaller than the radius $r$ of the rubbing bodies 27 in order to avoid the risk of any rubbing bodies becoming wedged and stuck between the rings 6. In this manner it is assured that the rubbing bodies 27 will always roll downwardly over the rings 6.

The rings 6 of the cataract or intercepting device 23 are preferably staggered in such a manner that the flow of cooling water can only cause the rubbing bodies 27 to impinge upon and thus be pressed against, the edge of one ring 6 at a time thereby ensuring particularly high deforming pressure on the rubbing bodies. Owing to this, the rubbing bodies are relatively heavily compressed and in repeated alternation subsequently expanded whereby the rubbing bodies get rid as completely as possible of any particles of deposits and other impurities carried along. The flow resistance of the cataract funnel 23 may be reduced to a very small amount by smoothing the surfaces of rings 6, for example, by enamelling them or coating them with foil. The direction of flow prescribed for the interception and conduction of the rubbing bodies is produced by the blade rings of the funnel-shaped cataract 23 or, if necessary, by deflector sheets placed in front of it. The cooling water thus conducts the rubbing bodies 27 to the middle of the funnel and into the return conduit 24 provided thereat. The height of the funnel-shaped cataract or intercepting device 23 is advantageously approximately equal to the radius of the cooling water conduit 17 for reasons to be explained more fully hereinafter.

The cataract funnel 23 is adapted to be tilted, during the operation of the condenser, about two trunnions 8 or a shaft secured on a holder ring 9 (FIGURES 8 and 9). In this manner impurities which have settled between the blade rings may be rinsed off.

The smoothening of the blade surfaces, for example, the enamelling thereof, is simpler in the case of insertable blade rings than in the case of straight bars of a rake or grate, because the latter are usually rigidly connected to cross bars and are, therefore, liable to become warped at the high temperatures of the enamelling process.

Referring now to a modified form of the funnel cataract 23″ illustrated in FIGURES 10 and 11, the funnel is divided in two halves 123a and 123b, which halves are adapted to be tilted apart as shown in FIGURE 11.

In a further modified construction illustrated in FIGURES 12 and 13, a rotatable scraper 10 is arranged inside the cataract funnel 23, this scraper 10 being adapted to be put into rotation by means of a shaft 11, for example, under the action of a turbine blade 12 actuated by the flow of water, the rotation taking place continuously or at intervals, as desired.

In addition to the various embodiments of the funnel-shaped cataracts or intercepting devices 23 and 23″ described hereinabove, other modifications are possible within the scope of the present invention.

As must have become quite clear from the foregoing, an important component part necessary for an effective realization of the continuous cleaning of a heat exchanger of the pipe or tube-type during the operation thereof, as illustrated by the funnel-shaped conical cataract or sieve, shown in FIGURES 4 through 13, is the separating and intercepting arrangement for the rubbing bodies in the cooling medium discharge conduit.

Regardless of whether this arrangement is made, for example, as a funnel-shaped conical cataract or sieve with annularly shaped or spirally shaped rods or as a flat sieve with straight rods, the following basic requirements are necessitated to achieve the intended purposes:

(1) Such an arrangement must be able to permit practically the entire cooling medium to pass therethrough without impediment and must only offer relatively slight flow resistance since any such additional flow resistance must be compensated for or must be additionally overcome by the main pump for the cooling medium. Furthermore, such an arrangement must be so constructed that if the cleaning operation is not carried out continuously it may be taken out of operation and thereupon renders the line for the cooling medium as free as possible.

(2) Such an arrangement must also be able to return the elastic rubbing bodies, made of a specific weight equal to that of the cooling medium, as quickly as possible by means of the cooling medium flow into the suction line portion of the return pump for the rubbing bodies.

(3) Such an arrangement must also be so constructed that the rubbing bodies upon impinging on the cataract or sieve elements are compressed as much as possible and thereby are deformed so that the cooling medium thereby squeezed out of these rubbing bodies by such action removes and carries off the dirt particles adhering thereto.

(4) Such an arrangement must further be so constructed that the larger impurities of the cooling medium which have collected on the installation may be removed during operation as otherwise a clogging up of the arrangement might jeopardize the entire heat exchanger installation and may necessitate that the same be taken out of operation altogether.

In practice, it has been found that a completely satisfactory, unobjectionable and fully adequate interception of the rubbing bodies by an installation which minimizes the flow losses, and which fully satisfies the above requirements, is possible if:

(a) the separating and intercepting device is formed as a gap-type screen or sieve;

(b) the rubbing bodies arrive in the suction line of the return pump in the direction of the flow of the cooling medium;

(c) the flow velocity of the rubbing bodies in the direction of the suction line of the return pump is equal to or larger than the main flow velocity of the cooling medium in the discharge line thereof;

(d) the width of the gap-type sieve remains essentially constant as seen in the direction of flow of the cooling medium or, as is possible, for example, with spirally-shaped sieve rods, increases or widens in the direction of the suction line of the return pump so as to prevent as much as possible the rubbing bodies or larger impurities to become stuck and (e) all discharge ends of the sieve rods terminate within the cooling medium line or, as described in connection with the conically-shaped funnel-shaped sieve, are endless.

The preferred embodiment of an intercepting and separating arrangement for the rubbing bodies illustrated in FIGURES 16, 17 and 18 is a particularly appropriate and advantageous construction since it fulfills all of the aforementioned requirements in a most satisfactory manner. This arrangement consists essentially of the pipe or conduit portion 104 adapted to be inserted into the condenser outlet conduit 21 or discharge conduit 22 by appropriate connecting flanges and provided with the two semi-elliptical flat sieve portions 101, the funnel portion 102 and the suction line or conduit 103 for the return pump (not shown).

The flat or plane sieve portions 101 are more or less inclined depending on the maximum flow velocities of the cooling medium occurring in the conduit portion 104 which itself is appropriately built into the discharge line of the pipes for the heat exchanger, as mentioned above in order to maintain the surface or contact pressure of the rubbing bodies 27 at the sieve rods forming the sieve portions 101 within the permissible limits and in order to avoid a sticking or adhering of the rubbing bodies at the sieve portions 101. The two base lines of the sieve portions 101 form a rectangular discharge cross section with the walls of the conduit portion 104. The funnel portion 102 adjoins the rectangular discharge cross section with its largest opening. The rubbing bodies carried by the flowing cooling medium thus travel from the sieve portions 101 into the funnel portion 102 and from the funnel discharge portion 105 into the return line 103.

The funnel portion 102 always possesses a rectangular cross section in all planes perpendicular to the conduit axis which cross sections decrease from the larger cross section thereof adjacent the base lines of the flat sieve portions 101 to the funnel discharge cross section 105 thereof.

The funnel portion 102 is formed by the triangularly shaped sheet metal plates 106 arranged parallel to each other and parallel to the direction of flow of the cooling medium, and of the two oppositely disposed rectangular flat sieve portions 107. The funnel sheet metal plates 106 are retained by means of clamps 108 or brackets (FIGURE 18), distance bolts 109 (FIGURES 16 and 17) and the shaft support means 110 of the flat sieve portions 107 (FIGURES 16 and 18). The cooling medium entering into the funnel-shaped portion may thereby flow therethrough freely as in the case of the flat sieve portions 101 whereby the rubbing bodies which are disposed in the funnel-shaped portion 102 on the rectangular sieve portions 107 are conveyed into the discharge funnel portion 105 and therewith into the return line 103. By reason of the fact that the funnel sieve portions 107 are bent at the discharge ends thereof so as to extend in parallel to the pipe axis a forced movement of the rubbing bodies into the return line 103 is achieved thereby.

The sieve funnel portion 102 may also be formed as an enclosed sheet metal container whereby, however, the corresponding sieve walls are provided with apertures in a sieve-like manner. However, in this case, the flow resistance of the separating devices is always relatively much larger and, therefore, more undesirable in any installation in which flow losses are of significance.

The main sieve portions 101 and the rectangular funnel sieve portions 107 are constructed as gap-type sieves and consist of straight thin profile wires 113 having particularly slight flow resistance as shown, for instance, in FIGURE 6, and are slung at predetermined distances about round rods 111 disposed parallel to one another which in turn are supported in flat rail portions 112 respectively or the like. The wires 113 are spaced from each other a predetermined distance depending primarily on the size of the rubbing bodies as well as to some extent on the pressure of the fluid. As a general rule, the wires are spaced from one another about one-third the diameter of a rubbing body.

The intercepting device according to FIGURES 16-18 is so constructed that the half elliptical sieve portions 101 and the rectangular funnel sieve portions 107 may be rotated during operation into the position thereof indicated in dash lines so that the large impurities which adhere thereto and which cannot pass through the sieve gaps between the wires 113 are cleaned and carried off by the cooling medium itself in the counterflow principle. For that purpose the two main sieve portions 101 are rotatably supported with the shafts 115 thereof in the bearings 114 at the pipe walls of conduit portion 104. The lever devices 116 are each connected, at one end thereof, in a joint-like manner by means of pins 117 with respective sieve portions 101 and, at the other end thereof, by means of pins 118 and 118' which are arranged laterally at the spindle nut members 119 and 119' at a spindle 120 provided with a right-handed and a left-handed threaded portion 120' and 120" respectively. If the spindle 120 is rotated by means of the crank 121 thereof, then the nut members 119 and 119' move from the position thereof near the center of conduit portion toward the position thereof near the walls of conduit portion 104 while simultaneously therewith taking along the lever devices 116 and thereby rotating the main sieve portions 101 into the position thereof indicated in dash lines. This rotating mechanism may also be arranged outside of the conduit portion 104 if the shafts 115 are extended outwardly of the conduit portion 104 through appropriate fluid-tight packings or the like.

The funnel-shaped sieve portions 107 are secured at the shafts 122 which in turn are rotatably supported in the funnel sheet metal plates 106. The sieve portion 107 may also be rotated by means of a crank 123 and shaft 122 into the position thereof indicated in dash lines, and may thereby also be cleaned directly by the cooling medium during operation thereof in the counter flow principle.

If the auto-cleaning installation in accordance with the present invention is to be placed out of operation for a longer period of time, then the flat sieve portion 101 and 107, as described, are positioned by means of the cranks 121 and 123 in such a manner that the sieve surfaces are essentially parallel to the direction of the flow of the cooling medium. With such a position of the sieve portions, the cooling medium discharge line offers the largest possible flow cross section and thereby offers the least possible flow resistance.

For the acceleration of the water circulation through the shunt or return conduit 24 use may be made of an acceleration pump according to the invention of special construction as schematically illustrated in FIGURE 14. In FIGURE 14, reference numeral 13 indicates a substantially cylindrical rotor, the peripheral surface of which takes the water along in a spin-like manner and by boundary layer adhesion. By means of a stationary flow lock 14, which allows the rotor 13 to pass with a small distance between the lock and the peripheral surface of the rotor, a predetermined flow is ensured in the pump chamber.

In order to reduce wear of the walls of the acceleration pump shown in FIGURE 14, cage-like structures may be arranged in the pump chamber which prevent contact of the rubbing bodies with the walls of the pump. This feature is particularly advantageous when rubbing bodies having abrasive coatings are employed.

Further, it appears advantageous, in order to ensure uniform distribution of the rubbing bodies to the tubes or pipes of the condenser and in order to increase the velocity and thereby the cleansing effect of the rubbing bodies in the condenser tubes, to supply the rubbing bodies from the shunt circuit to a trough which by slow rotation places itself in turn in front of all the tube inlets, thus ensuring a flow of the rubbing bodies in turn through all the tubes.

Cooling tubes of old condensers are in many cases covered with stony deposits formed after years of operation. Such deposits cannot be removed by elastic rubbing bodies, for example, rubbing bodies of sponge rubber such as are provided in the case of new condensers originally equipped for use with the method according to the present invention. For the initial cleansing and the removal of hard fur or the like in cooling tubes, other kinds of rubbing bodies are more suitable. Such bodies may consist of elastic material, their surface being covered with a lining containing granular abrasive substances. In order to reduce damage to the tubes, it is advisable to employ for this purpose a coating of the rubbing bodies which is permeated by filings or metal dust of the same material as that of the cooling tubes. Since such rubbing bodies of more rigorous action would attack the cooling tubes after removing the fur, they have to be removed from the circulation after a certain time of operation. For this purpose, it is advisable to provide a lock or other suitable device in the circulation conduit 24 which enables the rubbing bodies to be led off.

In condensers which from the beginning are operated by the self-cleaning methods hereinabove described, these devices may be utilized for removing rubbing bodies which have become ineffective by wear or bodies excessively loaded with impurities from the circulation and replacing them by other bodies.

Since the rubbing bodies are subjected during the cleaning action to wear and tear and gradually become less effective in the cleaning action thereof, the rubbing bodies must be replaced from time to time in order to maintain an essentially constant clean cooling surface in the condenser. It has been discovered in practice that the size of the new rubbing bodies and the manner in which the rubbing bodies present in the cleaning circulatory system are replaced from time to time is of great significance insofar as the economy of the cleaning method is concerned.

The magnitude of the frictional force of a rubbing body in the cooling pipe is particularly dependent on the cross sectional size thereof. If the rubbing body has a cross section which is equal to the free cross section of the cooling pipe, then the rubbing force and the cleaning effectiveness is relatively slight notwithstanding the relatively large velocity in the cooling pipe. If, however, the rubbing body cross section is increased over and above the free cross section of the cooling pipe then the velocity during passage through the cooling pipe decreases. However, at the same time, the rubbing force and therewith the cleaning effectiveness considerably increases as a result of the larger pressure in the cooling pipe. The rubbing body cross section may thereby be increased over and above the free cross section of the cooling pipe and therewith its rubbing force may be increased, though the velocity energy is thereby reduced, up to the point where the simultaneously occurring frictional resistance is about equal to the pressure force acting on the rubbing body, which pressure force is produced by the pressure difference between the cooling pipe ends during operation thereof. At that point the rubbing force and therewith also the frictional resistance of the rubbing body has achieved the greatest value. Since, however, simultaneously with an increase in the diameter of the rubbing body the velocity of the rubbing body in the cooling pipe has more and more decreased, the effectiveness of the cleaning action of the rubbing body has also again decreased. The theoretically greatest possible cross section of the rubbing body is achieved when the elastic soft rubbing body is enlarged over and above the free cross section of the cooling pipe by such an amount that the frictional resistance exerted by the cooling pipe walls on the rubbing body is in equilibrium with the pressure exerted thereon by the cooling medium. In practice, this pressure, i.e., the pressure difference between the cooling pipe ends, is subjected to continuous slight fluctuation. Consequently, the practically largest possible cross section of the rubbing body is thereby determined by the mean maximum pressure difference so that the rubbing bodies cannot become stuck in the cooling pipes.

If a rubbing body having the maximum possible cross section, as described above, is placed into the cleaning circulatory system, then initially with the largest possible frictional force, though with minimum traversing speed, the actual cleaning effectiveness is slight. With increased wear, i.e., with decrease in the cross section of the rubbing body, the rubbing force decreases slightly whereas the velocity increases whereby the cleaning effectiveness also increases. The maximum cleaning effectiveness is always obtained only as long as the cross section of the rubbing body is still larger than the free cross section of the cooling pipe. If the wear of the rubbing body ultimately has gone so far that the rubbing body cross section is equal to the free cooling pipe cross section, then the rubbing body encounters practically no resistance in the cooling pipe and the cleaning effectivenss becomes only very insignificant.

The practical realization of the cleaning method in accordance with the present invention, for purposes of achieving a clean cooling surface which remains essentially constant as regards cleanliness can only be achieved in principle according to two methods.

(a) According to the first method, the entire number of rubbing bodies is periodically replaced when the required cleaning effectiveness has become too small.

(b) According to the second method, the most worn rubbing bodies are continuously replaced by new rubbing bodies having the largest possible size as described hereinabove.

If it is assumed that the required cleaning action remains constant, then with the first method according to which rubbing bodies of maximum size are selected, a relatively large number of rubbing bodies is necessary by reason of the initially slight specific cleaning action thereof. If these rubbing bodies attain the specific optimum cleaning action, then the total cleaning effect thereof and therewith also the wear is larger than is necessary for purposes of maintaining the required cleanliness of the cooling surface. If, with this periodic method, rubbing bodies of optimum cleaning effectiveness are used then the number of rubbing bodies necessary in the circulation is less, however, the exchange period is shorter, i.e., the quantity of rubbing bodies required during a predetermined period of time is relatively large.

Consequently, this first method of periodic exchange of all the rubbing bodies accompanied by the variations in the cleaning effectiveness connected therewith which in effect always lies above the cleaning action necessary and therewith produces an undesirable additional wear on the rubbing bodies, requires a greater number of rubbing bodies as compared to the second method.

If, on the other hand, rubbing bodies of maximum possible size are used, as described hereinabove, which are continuously added to the circulatory cleaning system in quantities corresponding to the requirement for maintaining constant the cleanliness of the cooling surface and with the simultaneous removal of the rubbing bodies worn the most, then the optimum use of the rubbing bodies is obtained by this continuous method of replacement of the rubbing bodies, a cleaning action most suitably adapted to the prevailing operating conditions is achieved, and therewith the absolute least wear and use of the rubbing bodies is assured. This second method is, therefore, to be considered as the most economical manner of replacement of the rubbing bodies. Practical tests have also proved this. For example, for purposes of maintaining cleanliness of a heat exchanger with pipes having a cooling surface of 1000 m.$^2$ approximately one hundred rubbing bodies of maximum size were used per month whereby on the average about 250 rubbing bodies were continuously present in the cleaning circulatory system. In that example, the inner diameter of the cooling pipe was twenty-one mm., the initial diameter of the rubbing bodies twenty-four mm. which corresponds to the maximum possible diameter discussed hereinabove, and the pressure difference between the cooling pipe ends was 1.50 m. water pressure which is equal to 0.15 a.t.

Any suitable means may be used to remove the rubbing bodies worn beyond a predetermined amount, for example, an appropriate grating or rail of suitable tapering configuration disposed in the return line 24 or 24'.

While I have shown and described several preferred embodiments in accordance with the present invention, it is understood that the same is not limited thereto but is susceptible of many changes and modifications within the scope of a person skilled in the art, and I intend to cover all such changes and modifications as encompassed by the appended claims.

I claim:

1. An apparatus for self-cleaning the tubes of a heat exchanger having a plurality of tubes, an inlet conduit connected with said tubes for conducting a heat exchange fluid to said tubes, an outlet conduit connected with said tubes, a plurality of rubbing elements in said heat exchange fluid for circulation therewith through said inlet conduit, all of said tubes and said outlet conduit, said rubbing elements being made of elastic material having an average specific gravity about equal to that of said heat exchange fluid and of a free diameter at least as great as the internal diameter of said tubes to assure as great as possible a rubbing surface thereof in the cooling tubes and unobjectionable passage through the individual tubes by the pressure drop between the ends of the tubes, an intercepting device for said rubbing elements disposed in said outlet conduit to intercept said elements while affording free passage therethrough for said heat exchange fluid, and means connected with said intercepting device to conduct said rubbing elements from said intercepting device to said inlet conduit to provide continuous circulation of said rubbing elements, said intercepting device including first sieve means in said outlet conduit to intercept said rubbing elements with a discharge opening and second sieve means of the funnel type adjacent to said discharge opening, and means for rotatably supporting said first and second sieve means to enable selective positioning thereof in a position in which impurities deposited thereon are washed away in the counterflow principle by the heat exchange fluid in said outlet conduit or another position in which at least a substantial portion of each sieve means is disposed parallel to the flow of heat exchange fluid to minimize flow losses when the self cleaning apparatus is out of operation.

2. An apparatus for self-cleaning the tubes of a heat exchanger according to claim 1 wherein said first sieve means include two essentially flat sieve portions, and wherein said second sieve means includes two wall portions disposed essentially parallel to the flow and two sieve portions forming with said wall portions a rectangular discharge aperture.

3. An apparatus for self-cleaning the tubes of a heat exchanger according to claim 2 wherein said two sieve portions of said second sieve means and said two walls form a funnel-shaped sieve.

4. An apparatus for self-cleaning the tubes of a heat exchanger according to claim 1 wherein said first and second sieve means are gap-type sieves formed by a plurality of parallel wires.

5. An apparatus for self-cleaning the tubes of a heat exchanger according to claim 4 wherein said wires are of streamlined configuration.

6. An apparatus for self-cleaning the tubes of a heat exchanger according to claim 1 wherein said first sieve means includes two essentially part elliptically-shaped gap type sieve portions providing a discharge aperture with the walls of said outlet conduit, and wherein said second sieve means includes two essentially funnel-shaped gap type sieve portions.

7. An apparatus for self cleaning the tubes of a heat exchanger according to claim 1 wherein said means connected with said intercepting device to conduct said rubbing elements therefrom to said inlet conduit includes means for discharging said rubbing elements into said inlet conduit essentially in counterflow principle with the direction of flow therethrough of said heat exchange fluid to assure random distribution of said rubbing elements through all of said tubes.

8. An apparatus for self cleaning the tubes of a heat exchanger according to claim 1 wherein said tubes of the heat exchanger are of non-circular cross section and wherein said rubbing elements made of elastic material are hollow to enable adaptation thereof to the non-circular cross section of said tubes.

9. An exchangeable intercepting apparatus adapted to be built into the discharge conduit of a pipe-type heat exchanger to intercept the rubbing bodies made of elastic material conveyed through the cooling pipes of the heat exchanger by the cooling medium to enable return of the rubbing bodies to the inlet conduit of the heat exchanger, comprising a conduit portion adapted to be readily installed into said discharge conduit, first sieve means in said conduit portion providing a discharge opening for said rubbing bodies, second sieve means of funnel shape in said conduit portion adjacent said discharge opening, and means for rotatably supporting said first and second sieve means to enable selective positioning thereof into a first position in which impurities deposited on said sieve means are washed away according to the counterflow principle or into a second position in which at least a substantial portion of each sieve means is disposed parallel to the direction of flow of said cooling medium to minimize flow losses when said sieve means are not in use.

10. An exchangeable intercepting apparatus according to claim 9 wherein said first sieve means include two essentially flat sieve portions disposed in the operative position thereof in said conduit portion in an inclined manner and leaving therebetween said discharge opening and wherein said second sieve means includes two sieve portions forming with the wall portions of said conduit portion a funnel-shaped gap-type sieve.

11. An exchangeable intercepting apparatus according to claim 9 wherein said first and second sieve means are gap type sieves formed by a plurality of parallel wires of configuration to minimize flow losses of said cooling medium.

12. In an apparatus for self-cleaning the tubes of a heat-exchanger having a plurality of tubes, inlet and outlet conduits connected with said tubes for conducting a heat-exchange fluid to and from said tubes respectively, and a plurality of rubbing elements in said heat-exchange fluid for circulation therewith through said conduits and said tubes for cleaning the latter, the improvement comprising an intercepting device for said rubbing elements disposed in said outlet conduit to intercept said elements while affording free passage therethrough for said heat-exchange fluid, means connected with said intercepting device to conduct said rubbing elements therefrom to said inlet conduit to provide continuous circulation of said rubbing elements through said tubes, said intercepting device including displaceable sieve means movable relative said outlet conduit to two positions, in one of which said sieve means intercepts said rubbing elements and provides said free passage for the heat-exchange fluid, and in the other of which said sieve means is arranged so that impurities deposited thereon are washed away by counterflow of said heat-exchange fluid therethrough.

13. Apparatus according to claim 12 wherein said sieve means is movable to a third position when the self-cleaning apparatus is out of operation to minimize resistance to fluid flow through said outlet conduit, at least a substantial portion of said sieve means being disposed parallel to the path of fluid flow in said third position.

14. An apparatus for self-cleaning the tubes of a heat exchanger having a plurality of tubes connected in parallel, means including an inlet conduit connected with said tubes for conducting a heat exchange fluid to said tubes, an outlet conduit connected with said tubes, a plurality of rubbing elements in said heat exchange fluid for circulation therewith through said inlet conduit, all of said tubes and said outlet conduit, said rubbing elements being made of elastic material having an average specific gravity about equal to that of said heat exchange fluid and of a free diameter at least as great as the internal diameter of said tubes to assure as great as possible a rubbing surface thereof in the heat exchanger while at the same time propelling said rubbing elements through said tubes by the pressure drop existing between said inlet conduit and said outlet conduit to thereby assure uniform distribution of said rubbing elements throughout all of said tubes by the normal flow of said heat exchange fluid, an intercepting device for said rubbing elements disposed in said outlet conduit to intercept said elements while affording free passage therethrough for said heat exchange fluid, and a conduit means connected with said intercepting device to conduct said rubbing elements from said intercepting device in said outlet conduit and return them together with a stream of fluid into said inlet conduit so as to assure continued circulation of said rubbing elements, said conduit means including a conduit portion located essentially centrally of said inlet conduit with a discharge opening facing in a direction opposite to the direction of fluid flow in said inlet conduit for discharging said rubbing bodies with said fluid stream from said conduit means into said inlet conduit essentially in counter flow with respect to the flow of the heat exchange fluid therethrough and essentially centrally of said inlet conduit to provide a radial flow by the impact of the discharge of said fluid stream with said heat exchange fluid thereby assuring random distribution of said rubbing bodies into said inlet conduit and therewith into all of said heat exchanger tubes.

References Cited in the file of this patent

UNITED STATES PATENTS

| | | |
|---|---|---|
| 1,475,431 | Evans | Nov. 27, 1923 |
| 1,617,919 | Madsen | Feb. 15, 1927 |
| 1,795,348 | Schmidt | Mar. 30, 1927 |
| 2,069,139 | Flather | Jan. 26, 1937 |
| 2,763,017 | Redin | Sept. 18, 1956 |
| 2,801,824 | Taprogge | Aug. 6, 1957 |